United States Patent [19]

Matthews et al.

[11] Patent Number: 4,574,051

[45] Date of Patent: Mar. 4, 1986

[54] THERMOCHEMICAL ENERGY STORAGE

[75] Inventors: Andrew J. Matthews, Bournemouth; Simon A. Thomas, Ringwood, both of England

[73] Assignee: Edeco Holdings Limited, London, England

[21] Appl. No.: 519,995

[22] Filed: Aug. 3, 1983

[30] Foreign Application Priority Data

Aug. 12, 1982 [GB] United Kingdom ............... 8223256

[51] Int. Cl.$^4$ .................................................. C09K 5/06
[52] U.S. Cl. ....................................... 252/70; 165/10; 165/41; 165/104.11
[58] Field of Search ................... 252/70; 165/10, 41, 165/104.11

[56] References Cited

U.S. PATENT DOCUMENTS

| | | | |
|---|---|---|---|
| 2,979,463 | 4/1961 | Ferguson | 252/70 |
| 3,951,127 | 4/1976 | Watson et al. | 126/206 |
| 4,077,390 | 3/1978 | Stanley et al. | 126/263 |
| 4,199,021 | 4/1980 | Thoma | 165/1 |
| 4,273,667 | 6/1981 | Kent et al. | 252/70 |
| 4,331,556 | 5/1982 | Arrhenius | 252/70 |
| 4,361,491 | 11/1982 | Truelock | 252/70 |
| 4,451,383 | 5/1984 | Arrhenius | 252/70 |

FOREIGN PATENT DOCUMENTS

| | | | |
|---|---|---|---|
| 2627022 | 12/1977 | Fed. Rep. of Germany | 62/430 |
| 57-74380 | 5/1982 | Japan | 252/70 |
| 1435876 | 5/1976 | United Kingdom | 165/10 |

OTHER PUBLICATIONS

Cottrell, I. W. et al., "Gums", In: Kirk-Othmer Encyclopedia of Chemical Technology (1980 Ed.), vol. 12, pp. 45-66.

Primary Examiner—Paul Lieberman
Assistant Examiner—Robert A. Wax
Attorney, Agent, or Firm—Young & Thompson

[57] ABSTRACT

A thermal energy storage medium comprising a hydrophilic polysaccharide supporting an inorganic salt that is capable of transforming from one phase to a less hydrated phase absorbing latent heat, and releasing this latent heat upon the reverse transformation. The polysaccharide, preferably Xanthan Gum, may be incorporated in concentrations of 0.05% to 3% together with a nucleating agent in order to form a material that transforms when cooled back to the transformation temperature, or in greater concentrations of 1% to 5% without a nucleating agent to form a material that may be cooled below the transformation temperature without transformation taking place, and stored at ambient temperature while still storing the latent heat until activated.

The medium is gelled in the less hydrated phase and in some embodiments the gel is pseudoplastic thus enabling it to be poured into chambers of an energy storage device, and then regain its original viscosity at rest.

1 Claim, 4 Drawing Figures

M⁺ = Na, K, or ½ Ca.

THERMOCHEMICAL ENERGY STORAGE

The present invention relates to thermochemical energy storage utilising the latent heat of fusion of a salt hydrate.

A heat accumulating material which stores heat in the form of specific (or sensible) heat will dissipate heat and undergo a consequential reduction in temperature. However, a heat accumulating material which stores heat in the form of latent heat will dissipate heat at its transition temperature while remaining at a constant temperature. Furthermore a material storing latent heat may store more energy per unit volume than a material storing only specific heat.

It has been found that inorganic salt-hydrates are particularly suitable for use in thermochemical energy storage as they generally undergo a transition from a fully hydrated (or more hydrated) phase to an anhydrous or less hydrated phase at a characteristic transition temperature usually within the range of 10° C. to 100° C., whilst absorbing latent heat. These materials give up the latent heat of the phase change during cooling, when the compound reverts to the more hydrated phase, and thus can be used to store heat by being kept in the less hydrated phase. As the material must be maintained above the transition temperature in order to be kept in the less hydrated phase, the material and devices made from it necessarily store both latent and specific heat.

Two major problems are associated with the use of salt hydrates: the phenomenon known as supercooling, and difficulties associated with incongruency of the phase transition.

When a melt of a salt hydrate, that is the salt hydrate in its less hydrated phase in association with its water, is cooled it tends not to revert into the fully hydrated phase until the temperature of the mixture is below the transition temperature. This phenomenon is know as "supercooling" and is undesirable since the useful recoverable energy content of the storage material is lowered by this loss of specific heat and also the temperature at which transition actually takes place becomes unpredictable. In order to alleviate the problem of supercooling, the melt may be "nucleated" by a heterogeneous material having a similar atomic arrangement and lattice spacing as the crystallised hydrated compound.

The second and more serious drawback to the use of salt hydrates lies in the incongruency of the phase change between the fully hydrated phase and the less hydrated phase. As the material is heated to the transition temperature the material enters the anhydrous or less hydrated phase, and although some of the anhydrous solid may be dissolved in its own water of crystallisation, it is most likely that at least some of the anhydrous solid will remain undissolved. This undissolved solid is usually of greater density than the surrounding liquid, and therefore it settles out. Subsequently when the melt is cooled the anhydrous material and the water of crystallisation are not sufficiently intimately mixed, and some of the solid anhydrous material is not able to re-combine with its water of crystallisation: consequently the latent heat of the phase change of that portion of the solid anhydrous material is not given up on cooling and the system becomes non-reversible and unstable.

This incongruency may be overcome by agitating the melt by providing a mechanical stirrer, but this is not generally favoured as it requires an additional energy input and greater expenditure and maintenance. A more favoured approach to solving the problem of incongruency that has been adopted is to prepare the thermal energy storage material in the form of a chemical suspension in which the hydrated salt is initially mixed with a material that, when the hydrated salt enters the anhydrous or less hydrated form, effectively suspends the solid particles of anhydrous material immediately adjacent their own water of crystallisation. It has been proposed to utilise natural thickening agents such as starch, cross-link starch or cellulose, alginates, peat moss and wood chips as the basis for such a suspension. Alternatively it has been proposed to utilise synthetic thickening agents such as synthetic polymers like polyvinyl alcohol, polyacrylic acid, polyethylene oxide and acrylamide polymers. Various other materials have also been proposed such as clay, diatomaceous earth, magnesium oxide, zeolites and fumed silica. Of the above proposed materials probably only the acrylamide polymers, containing acrylic acid units, produced by Allied Colloids limited have proved to be successful on a commercial scale.

The present invention is directed towards providing an improved thermochemical storage medium and an improved energy storage device.

Accordingly the invention provides a thermal energy storage medium comprising a salt capable of performing a transition from a hydrated phase to an anhydrous or less hydrated phase on being heated above the transition temperature, the salt absorbing latent heat during the transition, and giving up the latent heat during a reverse of the transition of a hydrogel supporting the salt, the hydrogel comprising a hydrophilic polysaccharide.

The polysaccharide preferably comprises Xanthan Gum. When Xanthan Gum is used it may be used alone or in combination with galactomannans such as Guar Gum and/or Locust Bean Gum.

The preferred salt hydrate comprises sodium acetate trihydrate ($CH_3COONa.3H_2O$).

The medium may contain an insoluble nucleating agent for the catalysis of sodium acetate, preferably tetrasodium pyrophosphate decahydrate $Na_4P_2O_7.10H_2O$. The nucleation catalyst tetrasodium pyrophosphate decahydrate is preferably used in concentrations up to 1% by total weight of the medium.

The invention is now described by way of example with reference to the accompanying drawings in which.

A preferred thermal storage material in accordance with the invention comprises sodium acetate trihydrate suspended in a hydrophilic polysaccharide. Sodium acetate trihydrate is preferred as it has a high latent heat of fusion, of the order of 270 KJ/kg and a transition temperature generally given as 58.4° C. These properties compare favourably, in terms of usefulness, with those of the more widely used salt hydrates such as sodium sulphate decahydrate ($Na_2SO_4.10H_2O$), more commonly known as Glaubers Salt, which has a lower latent heat of fusion (250 KJ/kg) and a transition temperature of 32.4° C.

One of the most important properties of a suspension medium for thermal energy storage material are that it should form a permanent suspension and that it should not inhibit the phase change of the salt. For a suspension to be permanent it must have a yield value or at least an apparent yield value, that is not exceeded by the weight of the particle in suspension. (The yield value is the shear stress value below which flow does not occur or, in other words, a minimum force per unit area that must be applied before flow occurs.) Many of the thickeners previously proposed do not have a yield value and/or serve only to increase the viscosity of the melt, but unsatisfactorily so as the viscosity of the thickeners and resultant suspension is temperature dependent.

In a preferred embodiment of the present invention the salt hydrate (preferably sodium acetate trihydrate) is suspended by a natural hydrophilic bio-polysaccharide known as Xanthan Gum. Xanthan Gum is found to be extremely suitable for forming the suspension as it is compatible with many salt hydrates including sodium acetate, forms a hydrogel that has a definite yield value and also has a viscosity that is independent of temperature and pH. Also, a suitable suspension medium may be achieved with a concentration of Xanthan Gum of as little as 0.05% by weight of the medium.

Figure 1:
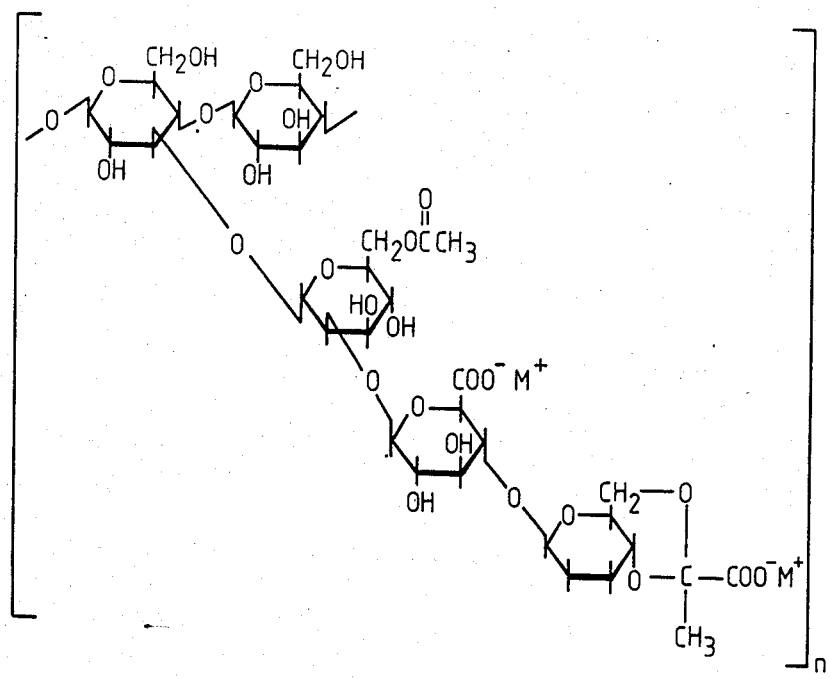
FIG. 1 is a formula drawing of what is believed to be the repeating unit structure of Xanthan Gum.

FIG. 1 shows what is believed to be the repeating unit structure of Xanthan Gum, which is a high molecular weight natural carbohydrate that in its usual form probably has a molecular weight of about 2 million, but it may be as high as 13 to 50 million. Xanthan Gum is produced by the micro organism *Xanthomonas campestris* in a fermentation process, the gum being an exocellular secretion produced during adverse conditions to assist in survival. Commercially the micro-organism is fermented in a well aerated medium containing glucose, a nitrogen source, di-potassium hydrogen phosphate and some trace elements. At the end of the fermentation process the gum is precipitated in iso-propyl alcohol, dried and milled. The gum in its dried and milled state is sold by Kelco, a division of Merck and Co. Inc., under the Trade Marks "KELTROL" and "KELZAN", of which Kelzan is the commercial grade.

The main chain of Xanthan Gum is similar to cellulose having β-D glucose units linked through the 1- and 4-positions. The side chain consists of three different mono-saccharides (mannose, glucose and glucuronic acid) in the form of a mixed sodium, potassium and calcium salt and is linked to the 3-position of every alternate glucose residue in the main chain. As the gum has an unvarying chemical structure it has uniform chemical and physical properties, the side chains, so it is believed, forming a shield for the main chain and giving an extraordinary stability.

In addition to the suitability of Xanthan Gum for forming a suspension material, aqueous solutions of the gum display pseudoplastic properties. Thus the gel formed by the Xanthan Gum/sodium acetate trihydrate material during the melt phase, that is when the material is at a temperature in excess of 58° C., also displays pseudoplastic properties being a fluid during shear (such as when poured) but regaining its original viscosity as soon as it is at rest. This property is particularly useful in the manufacture of heat storage devices in accordance with the invention, for example as that shown in FIG. 2 and described hereinafter.

Although Xanthan Gum has a natural resistance to bacterial degradation, as its evolved function is to provide a barrier against adverse conditions, it is preferred to incorporate a small quantity of bactericide in the suspension in order to ensure that is is resistant to bacterial attack over a long period of time.

In some embodiments of the invention it is preferred to inhibit supercooling: in these instances a nucleating agent is included and to this end tetrasodium pyrophosphate decahydrate has been found particularly suitable, preferably used in concentrations up to 1% by total weight of the medium. The embodiments in which supercooling is inhibited or the "first type" of material, have a Xanthan Gum concentration in the range of 0.05% to 3%, more preferably 0.5% to 2%, by total, weight of the material.

Figure 2:
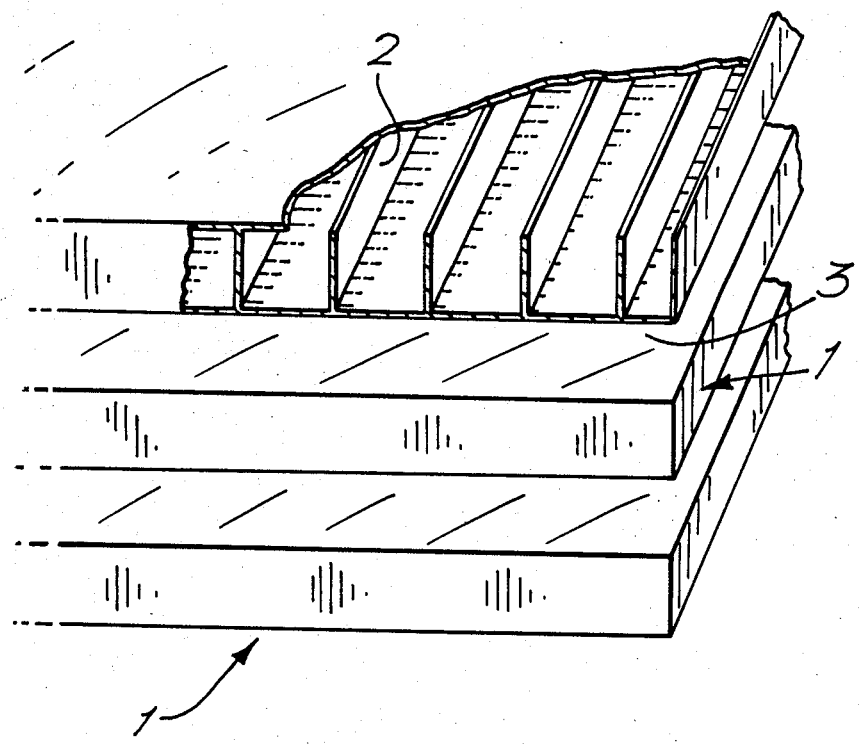
FIG. 2 is a perspective view, partly cut away, of a portion of an energy storage device in accordance with the invention.

Referring now to FIG. 2, a thermochemical energy storage device according to the invention is shown, the device comprising a plurality of spaced apart parallel plates 1, each plate having side and top and bottom walls enclosing a series of channels or cells that are separated from each other by partitions 2. The plates and partitions may be formed of moulded or extruded polypropylene or other plastics. Due to the above mentioned pseudoplastic property of the thermal energy storage material it can be incorporated into the channels by pouring while it is in the melted state, the channels then being sealed. Heat is transferred to and from the material in the channels by passage of a fluid through the spaces 3 between the plates 1, the transfer being efficient due to the relatively small size of the channels. Thus to heat the energy storage material, a hot fluid is passed through the spaces 3, and in order to extract heat from the material a cool fluid is passed. Various modifications to this basic exemplary structure are possible, the object being to exchange heat efficiently between the storage material and the fluid. For example the fluid could be passed through channels in the plates with the thermal energy storage material located in the spaces between the plates.

It has been found that only a minimal separation of the solid particles occurs during many cycles of heating and cooling of the above described apparatus. Also the material may be utilised with chambers of any depth or volume, although it is preferred to utilise relatively small chambers as described above to ensure a good transfer of heat from the fluid medium to the thermal storage medium.

This type of thermal energy storage device when incorporating the first type of material stores heat in both latent and specific forms and may find many applications, including the storage of solar energy, and because its transition temperature of 58.4° C. it is ideally suited to 'wet' heating systems and a heat pump that has its input in a river, or buried underground, or in air. In such a case the heat pump may be operated on cheap off-peak electricity and the storage device may store the energy for daytime use in heating water for domestic or industrial consumption or for use in a central heating system.

As previously described, salt hydrates including sodium acetate trihydrate may melt incongruently at the phase transition to the less hydrated state, the melt tending not to revert to the more hydrated state at the correct transition temperature. This supercooling can continue (in the case of sodium acetate trihydrate) until the melt reaches −20° C. before spontaneous nucleation occurs. However, nucleation will occur at differing temperatures below the transition temperature of 58.4° C. This phenomenon has always been considered as undesirable and, as with the first type of material of this invention, it is generally preferred to inhibit supercooling. However in further embodiments of the present invention the phenomenon of supercooling is modified and used to provide a second type of latent heat storage material and device.

In these embodiments the preferred thermal energy storage material comprises sodium acetate trihydrate suspended in a hydrogel which comprises a relatively high concentration of hydrophilic polysaccharide which is perferably Xanthan Gum, typically in the range of 1% to 5% and more preferably 3% to 5%, by total weight.

It has been found that on cooling a melt with a Xanthan Gum concentration in the range of 1% to 5% and in the absence of a nucleating agent, nucleation and therefore phase change does not occur until the melt is purposely activated, at which point the temperature rises sharply to the transition temperature and all the latent heat is given up. The material can be stored in its charged state for many months if required, and charged and discharged repeatedly. Some samples have undergone over 100 heating and cooling cycles to date. With this material specific heat is not stored as it is given up during cooling to the ambient temperature at which the charged material is stored: the purpose of this particular material and devices made from it being to store latent heat only.

An advantage of these embodiments is that the material and devices need not be maintained above the transition temperature in order to keep the devices charged. It is this feature that makes long term storage a viable proposition.

With Xanthan Gum concentrations as high as 5% the storage efficiency, or the percentage of material actually subject to the phase change, is clearly less than with materials of lower Xanthan Gum concentrations. One way of improving this efficiency is to replace the Xanthan Gum with other polysaccharides giving the same viscosity effect for lesser concentrations, and it has been found that mixtures of polysaccharides have synergistic effects on the viscosity. In particular Xanthan Gum in combination with galatomannans such as Guar Gum and/or Locust Bean Gum have been found to yield a similar viscosity increase at much less total concentration than Xanthan Gum alone. For example the overall preferred concentration may be reduced from 3% to 5% down to 1% to 1.5%.

Figure 3:
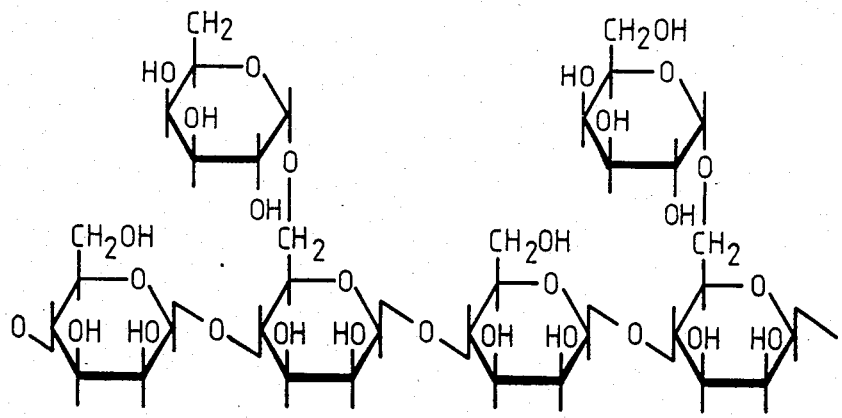
FIG. 3 is a formula drawing of what is believed to be the repeating unit structure of Guar Gum.
Figure 4:
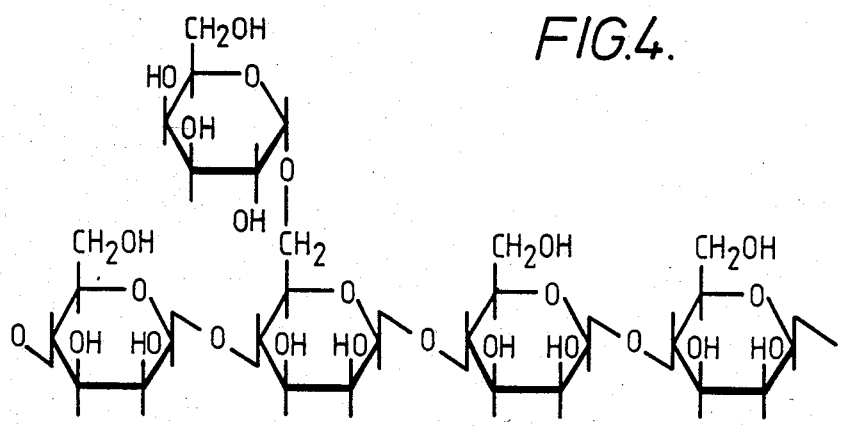
FIG. 4 is a formula drawing of what is believed to be the repeating unit structure of Locust Bean Gum.

FIGS. 3 and 4 show simplified structures of Guar Gum and Locust Bean Gum. The backbone of both polymers is made up of a linear chain of $\alpha$-(1$\rightarrow$4)-linked D-mannose units, and attached to the backbone by $\beta$-(1$\rightarrow$6) are single unit D-galactose side chains. For Guar Gum the mannose to galactose ratio is 1.8 and for Locust Bean Gum the ratio is 4.

Xanthan Gum/Locust Bean Gum is available in a commercially blended product known as "Kelgum", which is a Trade Mark, marketed by Kelco Inc.

Due to the high apparent viscosity of Xanthan Gum/Locust Bean Gum solution, suspension of solids can be attained at very low concentrations.

When mixed with Guar Gum or Locust Bean Gum, Xanthan Gum loses its pseudoplasticity, the gel formed being thermally reversible, and so, in general, for the first type of material (where the Xanthan Gum concentration is in any case low) polysaccharide mixtures are not normally necessary and the pseudoplasticity property of Xanthan Gum is of greater usefulness. However, as explained above, when an improvement in efficiency is required, as may be the case with some applications of the second type of material, the polysaccharide mixtures are of more importance.

In its gelled state the melt of the second type of material exhibits surprisingly stable properties and after an initial settling period during which it may be more sensitive it may be transported, moulded, frozen, stirred or even violently shaken. Under controlled conditions it may even be removed from its container, divided and placed in separate containers, then activated when required.

The gelled melt may be reliably activated, or nucleated, i.e. 'triggered' in some way, by a variety of methods. In general the technique appears to be to nucleate the melt by introduction of an external nucleating source (an embedded nucleating source appearing to be ineffectual) or by causing local melting. A suitable nucleating source to introduce is a single crystal or in some circumstances a sharp point. Local melting may be achieved by a small electrical current, for example, or in the case of pseudoplastic Xanthan Gum gels local melting may result from a shear stress applied to the gel. Triggering of the gel may be achieved either by manual, automatic or remote means.

Energy storage devices utilising the second type of material with higher concentrations of Xanthan Gum and/or Locust Bean Gum and/or Guar Gum, may find many applications, for example, a storage device of this kind could be incorporated in a motor vehicle, the exhaust gas and/or coolant medium being used to heat the device which, once the engine of the vehicle is switched off, cools to the "suspended supercooled" state. The device could then be nucleated when required by manual, automatic or remote means, and used for pre-heating the engine block to increase engine life and aid starting, or heating the passenger compartments and defrost the windows, or any combinations of these, or even removed from the vehicle and used for some other purpose.

The device has obvious military applications, such as, pre-heating engine blocks and/or batterys of tanks and other automotive vehicles located in forward positions.

It could be incorporated into survival equipment such as life jackets and life rafts.

Devices incorporating either the first or the second type of material may be used in banks to absorb waste low grade heat from cooling towers or industrial processes. These devices may be portable so that heat could be transported to other locations for use when required.

Finally some examples of specific ways of preparing thermal energy storage media in accordance with the invention, and examples showing the specific properties of the energy storage media are given. The preferred starting material is the Xanthan Gum as sold under the Registered Trade Mark "Kelzan", which is a hydrophilic colloid, and thus once this material is made wet it will dissolve very rapidly. However, when a mass of granules is put into water without sufficient agitation for complete dispersion, clumps of solvate appear, forming a layer which prevents wetting of the interior of the clump. Thus uniform dispersion of the gum in water requires high shear mixing. A high shear mixer or agitator should produce a good vortex, and preferably the agitator is placed off-centre of the mixing vessel to obtaining maximum turbulence at the lowest portion of the vortex. The agitator blades should be submerged to prevent excessive aeration. The powdered gum is sifted slowly onto the upper walls of the vortex so that the individual granules are wetted out, addition being completed before the resultant thickening of the mixture destroys the vortex.

EXAMPLE 1

0.8 gram of Kelzan was carefully added to 79.44 grams of distilled water and mixed using the vortex method mentioned above and mixing was continued for 30 minutes to ensure that the Kelzan was fully wetted. This viscous solution was then added to a flask containing 120.56 grams of anhydrous sodium acetate and this mixture was thoroughly mixed and heated to 80° C. until all the solid particles had melted. Water loss was prevented by using cold water condensors. The mixture was allowed to cool by 10° C. and then maintained at 70° C. 2 grams of crushed tetrosodium pyrophosphate decahydrate was then added and thoroughly mixed for 30 minutes.

The resulting mixture was then poured into a polypropylene tube which was sealed and then placed in a water bath and subsequently heated between 40° C.–70° C.

EXAMPLE 2

8 grams of Kelzan was carefully added to 79.44 grams of distilled water and mixed in accordance with Example 1. The resulting solution was then added to a flask containg 120.56 grams of anhydrous sodium acetate and this mixture was thoroughly mixed and heated to 80° C. until all the solid particles had melted. Water loss was prevented by using cold water condensors. The resulting mixture was mixed for a period of 30 minutes and then poured into a suitable polypropylene tube.

EXAMPLE 3

A thermal energy storage medium made in accordance with Example 2 was allowed to cool to room temperature and was then triggered by introducing a seed crystal of sodium acetate trihydrate. The mixture immediately gave up its latent heat and rose in temperature to 55° C. The mixture was then reheated to 70° C. and then cooled in a cold water bath. The medium could be triggered again as before.

EXAMPLE 4

A thermal energy storage medium in accordance with Example 2. was allowed to cool and then stored at a temperature of 10° C. for 150 days. After this period the sample was seeded using a crystal of sodium acetate trihydrate the sample then rising sharply in temperature to 55° C. and giving off its latent heat. The mixture was then reheated at 70° C. and then cooled in a cold water bath. The medium could then be triggered again as before.

We claim:

1. A thermal energy storage medium consisting essentially of sodium acetate trihydrate and xanthan gum having a concentration in the range of 1 to 5% by weight of the medium.

* * * * *